United States Patent [19]
Deli et al.

[11] 3,781,066
[45] Dec. 25, 1973

[54] TRACK PIN AND BUSHING SEAL ASSEMBLY

[75] Inventors: Jack M. Deli, Wheaton; Ramiz Y. Hermiz, Addison, both of Ill.

[73] Assignee: International Harvester Company, Chicago, Ill.

[22] Filed: June 16, 1969

[21] Appl. No.: 835,298

Related U.S. Application Data

[63] Continuation of Ser. No. 639,442, May 18, 1967, abandoned.

[52] U.S. Cl.................... 305/11, 29/148.3, 277/88
[51] Int. Cl............................................ B62d 55/20
[58] Field of Search.................. 305/11, 14, 58; 74/251–257; 277/81, 88, 92, 95; 267/162; 29/148.3

[56] References Cited
UNITED STATES PATENTS

| | | | |
|---|---|---|---|
| 2,713,482 | 7/1955 | Stapleton | 267/1 |
| 3,050,346 | 8/1962 | Simpson | 305/11 |
| 3,336,089 | 8/1967 | Krickler | 305/11 |
| 3,357,694 | 12/1967 | Kidder | 267/162 |

FOREIGN PATENTS OR APPLICATIONS 27,376    1910    Great Britain ................. 267/162

Primary Examiner—Richard J. Johnson
Attorney—Floyd B. Harman

[57] ABSTRACT

Track pin and bushing seal assembly of two Belleville spring washers separated by a flat metal washer.

10 Claims, 3 Drawing Figures

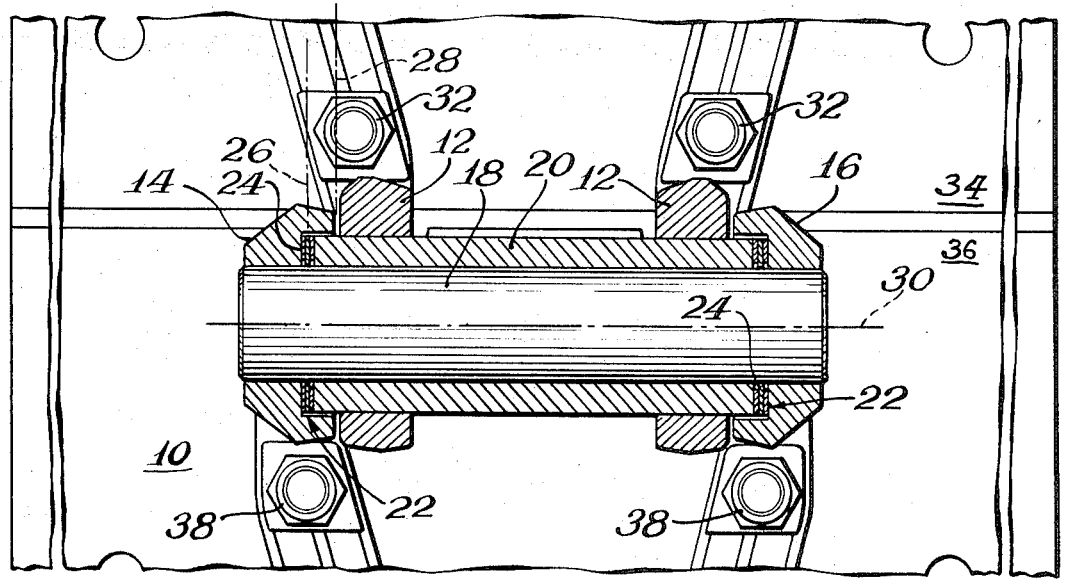
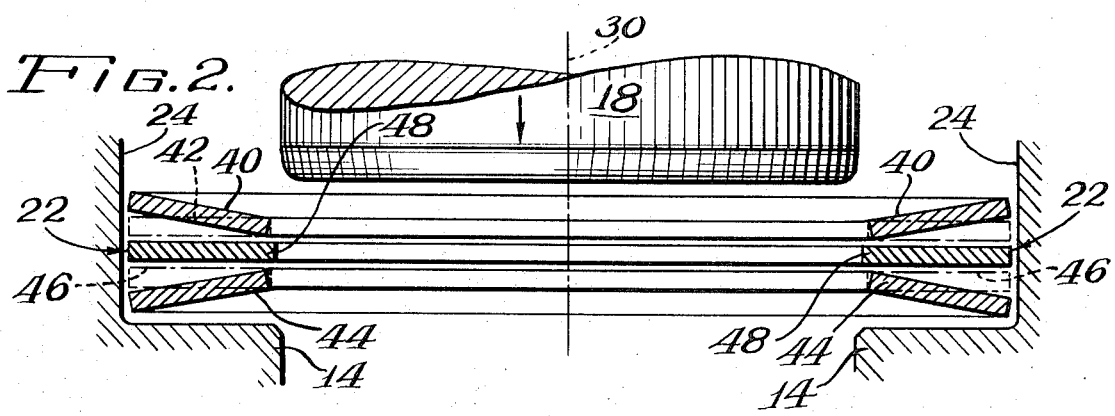
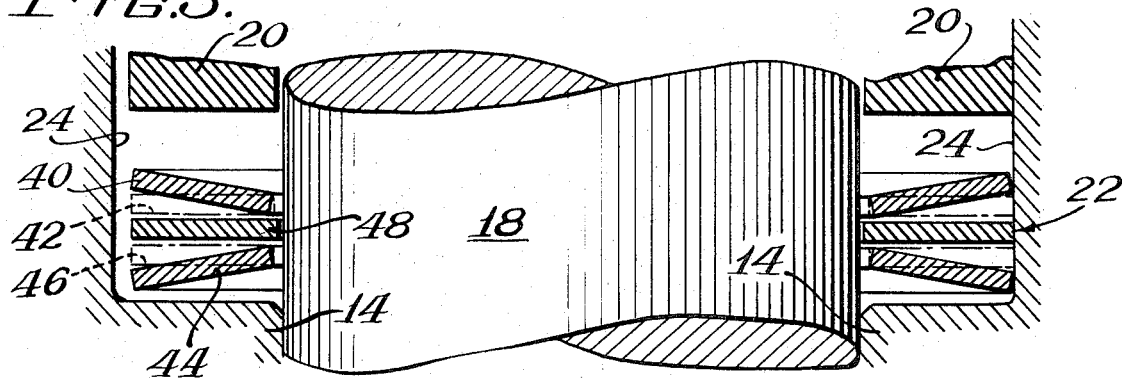

TRACK PIN AND BUSHING SEAL ASSEMBLY

The present application is a continuation of Ser. No. 639,442 filed May 18, 1967, and now abandoned.

This invention relates to a three-element rotary metal seal for the pin and bushing present in the track chain of a crawler vehicle, and adapted particularly to fit in a seal recess formed within a link joint in the track chain. One element is a flat metal water, and it separates the other two elements which consist of Belleville spring washers arranged so that their small ends are adjacent. The Belleville washers are ring springs, made of thin steel and dished into a frustoconical shape so as to elastically resist axial deflection.

The three-element face seal hereof affords the advantage of material reduction to, if not substantial freedom from, the problem of alignment involved when two or more Belleville springs are present in a stack stressed in compression. If Belleville springs are in immediate engagement, either at their small ends, or at their large ends, their respective circumferences coincide in only one common circle and, if they shift slightly eccentrically to one another in any radial direction, their interface of contact is reduced to two, high stress points only, rather than being a full circle of contact. So there is the possibility of the sealing between two Belleville springs being impaired, as well as the possibility of the interface, where relative rotation occurs, being transferred from an inter-washer wear area as desired to an inter recess-and-spring wear area or to an inter bushing-and-spring wear area which are undesired.

The intervening flat washer in the assembly or stack hereof projects radially beyond the more adjacent peripheral portions of the Belleville springs. Hence, the latter provide, at the least, uninterrupted rings of pressure contact made with, and disposed one on each side of, the flat washer so that either spring portion can accommodate all of the relative rotation between the parts by rubbing at all points against a planar surface. At the same time, the fit of the washers within the surrounding walls of the seal recess is not sufficiently loose to allow the flat washer to shift diametrically with respect to either Belleville spring washer to the extent that the periphery of a spring can slide radially beyond the edge of the flat washer at any point.

More specifically in the actual embodiment of the invention as illustrated herein, the Belleville springs are oriented in the assembly with their small ends adjacent the flat washer, so as to seal primarily with their confronting inner peripheral portions against the planar surface of the inner periphery of the flat washer. The resulting uninterrupted pairs of rings of pressure contact on opposite faces of the flat washer double the likelihood that the relative rotation will occur at the inner circumference of a Belleville spring in comparison to two Belleville springs relatively rotating directly against one another along a single interface. Hence our invention has practical importance in saving the bushing and recess from face wear as they relatively turn, and saving the seal effectiveness which could be impaired by improper seating as when one frustocone rubs directly against another.

Various features, objects, and advantages will either be specifically pointed out or become apparent when, for a better understanding of our invention, reference is made to the following description taken in conjunction with the accompanying drawing which shows a preferred embodiment thereof and in which:

FIG. 1 is a post-assembly showing in sectioned plan view, of part of the track chain of a crawler vehicle;

FIG. 2 is a preassembly showing, to enlarged cross-sectional scale, of a detail of FIG. 1; and FIG. 3 is similar to FIG. 2, but with the parts in a slightly shifted position for illustrative purposes and as located after predetermined movement of final assembly.

More particularly as shown in the drawing, each joint in the illustrated track chain assembly 10 includes two links having inner portions referred to as inner links 12, two more links having outer portions referred to as respective outer links 14 and 16, a pin 18 and a pin bushing 20 rotatable thereon, and a flattened, metal, face seal assembly 22 held under compression in a seal recess 24 in each of the outer links 14 and 16.

Two of the seal assemblies 22 are disposed one at each end of the bushing 20, and serve both as a thrust transmitting means for the end thrust transmitted by the bushing into the adjacent link, and as a rotary seal keeping out the dirt and keeping in a coating of lubricant, not shown, which is sealed in between the pin 18 and the bushing. The seal recess 24 in each outer link results from counter-boring same so as to house therein the projecting thrust end portion of the bushing 20, thus protecting the radially disposed end face of the bushing and the confronting seal assembly 22 from direct ingress of dirt. Thus the plane 26 of the seal which is conveniently indicated as passing through the middle element of the seal assembly is materially axially offset from the plane 28 between the links of the joint, and the referred to end portion of the bushing 20 is entirely housed.

At the point of beginning the final stage of assembly of the joint, the only parts fitted up at that time are each inner link 12 and the pin 18, which have respectively an interference fit with the bushing 20 achieved with a power press, and a hinge fit with the bushing 20 which, after lubrication of the bore in the bushing, is achieved by sliding the pin 18 thereinto until it protrudes at each end beyond the corresponding end of the bushing.

The final stage of assembly is accomplished with the joint arranged with its longitudinal axis 30 horizontal, and with each seal assembly 22 in place, hanging loosely on the pin 18 at one end adjacent the bushing end face at that end. Then, under axial power, the two bored outer links 14 and 16 are forced onto and along the pin 18 toward one another. When relative axial movement stops, the bushing 20 acts as spacer and the press power builds to a predetermined force value, at which time the assemblies 22 are flat. Thereafter, pressure is released in the press and the assembly is removed because the assembly is complete.

The bolts 32 of a four bolt group secure the inner links 12 to a leading track shoe 34 carried thereby, and the next or relatively trailing shoe 36 is secured to the outer links 14 and 16 by a similar four bolt group including the two bolts 38. During forward motion of the vehicle, the socalled leading shoe 34 is the first one of the two to strike the ground and is the first one of the two to reach the drive sprocket of the vehicle equipped with the present crawler track chain.

In FIG. 2, the outer link 14 and the pin 18 are shown prealigned on the longitudinal axis 30 of the joint, and the seal assembly 22 is shown intervening with its three elements in a theoretical position precisely squared to and centered on the joint axis 30. The end elements are symmetrically disposed, identical Belleville springs, the upper spring 40 of which as viewed in the drawing having a conical, relaxed position as shown in solid lines and having an extreme position when deflected flat indicated by the broken lines 42. The lower spring as viewed in the drawing is indicated in solid lines at 44 in the relaxed position, and it has an extreme position deflected flat as indicated in broken lines at 46, the latter condition being when it is in flush contact with the bottom of the recess 24. The cone angles of the two springs 40 and 44 converge and flare in opposite directions from one another, i.e., they face apart, and are equal when relaxed.

The separating element in the assembly is a flat metal washer 48. As viewed in cross section, the flat washer 48 extends radially inwardly at the inner periphery farther than the corresponding inner periphery of either spring 40 or 44 irrespective of the stressed condition of each spring and irrespective of the radial displacement of that spring in the plane of the recess 24.

The latter contingency is illustrated in FIG. 3. At the advanced point in the final stage of assembly as there illustrated, the outer link 14 is shown about to reach the stopping point at which it will cause the seal assembly 22 to be flattened between the end of the bushing 20 and the approaching floor of the seal recess 24 in the link. All elements of the seal assembly are shown settled against the right-hand side wall of the recess as viewed in FIG. 3, which is where the bottom most point is really located in actual practice, because the joint is preferably horizontal during assembly. No point on either spring 40 or 44 can ride inside of the flat washer 48.

In operation in a new joint, the metal face seal assembly 22 theoretically shows signs of a transition with the very first perceptible increment of rotative wear. The thickness of the seal recess 24 does not change, whereas the three element seal immediately grows slightly thinner. From their flat deflected position, the two Belleville springs 40 and 44 begin to cone in the direction of one another and, in place of the essentially flat face-to-face contact theretofore. the inner periphery of each spring along its external faces establishes a ring of pressure contact tending more and more to vacate the outer circumference and concentrate along the inner periphery of the flat washer 48. The springs 40 and 44, however, continue to react and transmit end thrusts received from time to time from the bushing 20, collapsing each time into their initial deflected positions in doing so. The spring forces on the flat washer are equal, registered, and opposite so that the flat washer does not appreciably distort.

Following are examples of inside diameter (ID) and outside diameter (OD) measurements of the seal and associated parts.

NOMINAL I.D. 's

Belleville springs 2.200 inches
Flat washer 2.150 inches
Recess 3.297 inches

MINIMUM I.D. 's

Belleville springs 2.195 inches
Flat washer 2.145 inches
Recess 3.287 inches

MAXIMUM I.D. 's

Flat washer 2.155 inches
Recess 3.307 inches

NOMINAL O.D. 's

Belleville springs 3.275 inches
Flat washer 3.275 inches

MAXIMUM O.D. 's

Belleville springs 3.280 inches
Flat washer 3.280 inches
Pin 2.125 inches

MINIMUM O.D. 's

Belleville springs 3.270 inches
Flat washer 3.270 inches

In a comparison between the Belleville springs and flat washers in terms of their above inside diameters, it is seen that each spring exceeds the washer approximately by 2.3 per cent in nominal ID and by 1.8 per cent when comparing the excess of the minimum spring ID over the maximum washer ID.

In a comparison between the recess and the flat and spring washers in terms of their above diameters, the recess ID exceeds the washer OD by no more than about 0.7 per cent in nominal diameter and yet the maximum ID of the recess exceeds the minimum OD of the washers by no more than about 1.1 per cent.

In their operative relationship in which they have a generally collapsed condition of assembly in the seal recess, the stack of seal washers is deflected toward substantially coextensive, flat face-to-face contact between the washers so that the thrust transmitted by each washer face is uniformly distributed over the major area of that face.

If the Belleville spring OD is slightly reduced or the flat washer OD is slightly increased, or both, so that the flat washer has the relatively larger OD by a few per cent, the user can assemble the seal with the large end portions of the Belleville springs adjacent the flat washer. The difficulty, compared to the preceding arrangement of the seal elements, is that the Belleville springs can then seal at their outer periphery against the flat washer 48 instead of against the recess and the bushing. Hence, direct protection of the bushing end and the bore bottom from dirt may be impaired and the likelihood that relative rotation will always occur on the faces of the flat washer may be reduced.

Wear in the present seal is characterized by two things. The wear tends to be confined to the interfaces within the seal assembly itself while the latter is under any appreciable amount of axial preload. The Belleville springs, at least in theory, will continue to expand or cone in taking up end play in the seal recess until the spring metal has reached a fully relaxed condition.

We claim:
1. A press assembly comprising:
   counterbored pin links;
   a bushing therebetween with thrust ends each arranged within, and in slightly spaced relation to the base of, the counterbore at that end, and effective to act as spacer in the final assembly;
   two sets of substantially radially coextensive thrust washers, each in a space aforesaid at an end of the bushing, each set comprising a sub-assembly of frusto conical spring washers with small ends adja- cent, and an ordinary washer therebetween acting as a separator plate and in accommodation to the spring washers expanding axially thereagainst with a spring action to take up end play automatically; the ordinary washer projecting inwardly radially beyond the more adjacent periphery of one spring washer and radially beyond the adjacent periphery of another of the spring washers whereby the latter provide, at the least, uninterrupted rings of pressure contact made with and disposed one on each side of, the ordinary washer, so that either spring washer can accommodate to relative rotation by rubbing against the ordinary washer;

the thrust washers when the assembly is pressed to the final extent determined by said spacer having a generally collapsed condition of assembly, deflected toward substantially coextensive, flat face-to-face contact so that the thrust transmitted by each face of a washer is uniformly distributed over the major area of the face of that washer.

2. In a joint in which a pin bushing and a link are relatively rotatably interconnected by a track pin, there being a recess in the link into which a projecting thrust portion of the pin bushing extends whereby that portion is fully housed within the recess, the improvement of:

a plurality of substantially radially coextensive thrust washers operatively related together in the recess between the end of the projecting thrust portion and the recess, comprising an assembly of frusto-conical spring washers and a flat washer separating the frusto-conical washers:

said assembly characterized by the cone angles of the spring washers converging in opposite directions from one another whereby the spring washers expand axially with a spring action to take up end play automatically, the flat washer projecting radially beyond the more adjacent periphery portions of the spring washers whereby the latter provide, at the least, uninterrupted rings of pressure contact made with, and disposed one on each side of, the flat washer, so that either spring washer portion can accommodate to the relative rotation of the parts by rubbing at all points against a planar surface;

said thrust washers in their operative relationship aforesaid having a generally collapsed condition of assembly, deflected toward substantially coextensive, flat face-to-face contact so that the thrust transmitted by each face of a washer is uniformly distributed over the major area of the face of that washer.

3. The invention of claim 2, in combination with the bushing, the link first named, and a second link, and further characterized by:

the second link embracing the bushing at a point so as to be in closely spaced juxtaposition to the plane between the two links in the joint;

said bushing projecting to a depth in the recess whereby the end of the projecting thrust portion thereof is appreciably offset from the plane between the links.

4. The invention of claim 2, further characterized by:
the aforesaid adjacent peripheral portions of the frustoconical spring washers comprising their small ends, and said flat washer projecting radially inwardly thereof.

5. The invention of claim 4, the spring washers characterized by the same dimensions and same cone angles, the nominal ID (inside diameter) of each spring washer exceeding the nominal ID of the flat washer by at least approximately 2.3 percent.

6. Method of press assembly of separate parts comprising counterbored pin links ready to be pressed, and a pin bushing therebetween in pre-assembly having each end of the bushing in the path of the counterbore at that end and acting as spacer for the assembly, said method characterized by the steps of:

the interposition of sets of thrust washers in the pre-assembly in the paths between the bushing and base of each counterbore, each set comprising an ordinary flat washer, and frusto conical spring washers arranged with the cone angles converging in opposite directions from one another and with the flat washer interposed as a separator plate so that either spring washer can accommodate to relative rotation by rubbing at all points against a planar surface; and a press together of the assembly to the extent determined by the spacer, flattening the sets of thrust washers toward substantially coextensive, flat face-to-face contact so that the thrust transmitted by each face of each washer in a counterbore prior to substantial wear is uniformly distributed over the major area of the face of that washer.

7. Method of press assembly of separate parts comprising counterbored pin links ready to be pressed, and a pin bushing therebetween in pre-assembly having thrust ends each in the path of the counterbore at that end and acting as spacer for the assembly, said method characterized by the steps of:

the interposition of two sets of thrust washers in the pre-assembly each in a path between the bushing and base of each counterbore, each set comprising an annular separator plate, and frusto conical spring washers arranged with their smaller ends one against each side of the annular separator plate; and a press-together of the assembly to the extent determined by the spacer, flattening the sets of thrust washers toward substantially coextensive, flat face-to-face contact so that the thrust transmitted by each face of each washer in a counterbore prior to substantial wear is uniformly distributed over the major area of the face of that washer.

8. Method of final assembly of a track link joint, said joint comprising a link and a pin bushing, the link and bushing of which are relatively rotatably interconnected by a track pin, and the link of which has a bushing recess formed therein so as to receive, in a path of relative movement in the direction of the base part of the link recess, a projecting thrust part of the pin bushing, said method characterized by the steps of:

interposition in said path of an assembly of frustoconical spring washers and a flat washer separating the frustoconical washers, arranged with the cone angles of the spring washers converging in opposite directions from one another; and the relative deflection of the washers toward flat face-to-face contact, accomplished by forcing one of said parts toward the other and characterized by the spring washers storing elastic energy for automatic axial wear takeup in the joint attendant with subsequent wear;

the deflection characterized by the flat washer projecting by one amount radially beyond the more adjacent peripheral portions of the spring washers prior to, and projecting by a second amount radially therebeyond after, application of said deflecting force.

9. The invention of claim 8, characterized by said amounts of projection differing.

10. The invention of claim 8, characterized by the second amount of projection being radially inwardly and radially lesser than the one amount but nevertheless a material amount insuring that each spring washer portion can accommodate to the relative rotation of parts by rubbing at all points against a planar surface.

* * * * *